United States Patent Office 3,487,850
Patented Jan. 6, 1970

3,487,850
RETRACTION UNIT FOR A DENTAL HOSE
Leon P. Wahler and Walter J. Rore, Stockton, Calif.,
assignors to Pacific Research and Development Corporation, Stockton, Calif., a corporation of California
Filed Apr. 17, 1968, Ser. No. 722,027
Int. Cl. A61c 1/18
U.S. Cl. 137—355.2    9 Claims

ABSTRACT OF THE DISCLOSURE

A storage device, for a dental hose or the like, which normally maintains the flexible hose in a compact retracted storage position, but permits of withdrawal of such hose to an extended position for use and thereafter spring-returns the hose to said storage position.

BACKGROUND OF THE INVENTION

In dental equipment the flexible hoses, one of which, for example, supplies compressed air to operate a dental instrument, are individually and manually pulled out of, and spring-returned into, an enclosure such as a pedestal or housing. With present equipment, problems are sometimes encountered in that the hose does not pay out and retract smoothly, and undue wear and kinking may result. Also with such present equipment, the enclosure for the hose, as retracted, must be very substantial length or depth. The hose retraction unit of the present invention was conceived in recognition of these problems.

SUMMARY OF THE INVENTION

The present invention provides, as a major object, a retraction unit, for a dental hose, which is most compact and yet assures of easy and smooth withdrawal of the flexible hose from, and subsequent retraction into, the enclosure for the unit; such movements of the hose occurring without possibility of kinking, and absent any wear-producing rubbing or abrasive contact of any portion of the hose with another portion thereof or with a part of the structure of the unit.

The present invention provides, as another object, a retraction unit, for a dental hose, which embodies a flat base plate on one side of which, in closely adjacent relation both as to position and movement, all of the hose-engaging and other working parts of the unit are mounted the retraction unit thus being not only compact but sufficiently shallow to occupy a relatively small space, whether mounted horizontally or vertically, in an enclosure such as a housing or cabinet and in which several of the retraction units may be disposed in tier-like array.

The present invention provides, as an additional object, a retraction unit, as above, wherein the working parts thereof include a guide and swinging arm assembly which engages and disposes the hose, when retracted, in a novel looped, very compact pattern and yet permits of the aforesaid easy and smooth withdrawal of the hose from the enclosure.

The present invention provides, as a further object, a retraction unit, for a dental hose, which is designed for ease and economy of manufacture, ready installation, trouble-free operation, and convenience of use.

The present invention provides, as a still further object a practical, reliable, and durable retraction unit, for a dental hose, and one which is exceedingly effective for the purpose for which it is designed.

DESCRIPTION OF THE PREFERRED EMBODIMENT

Figure 1:
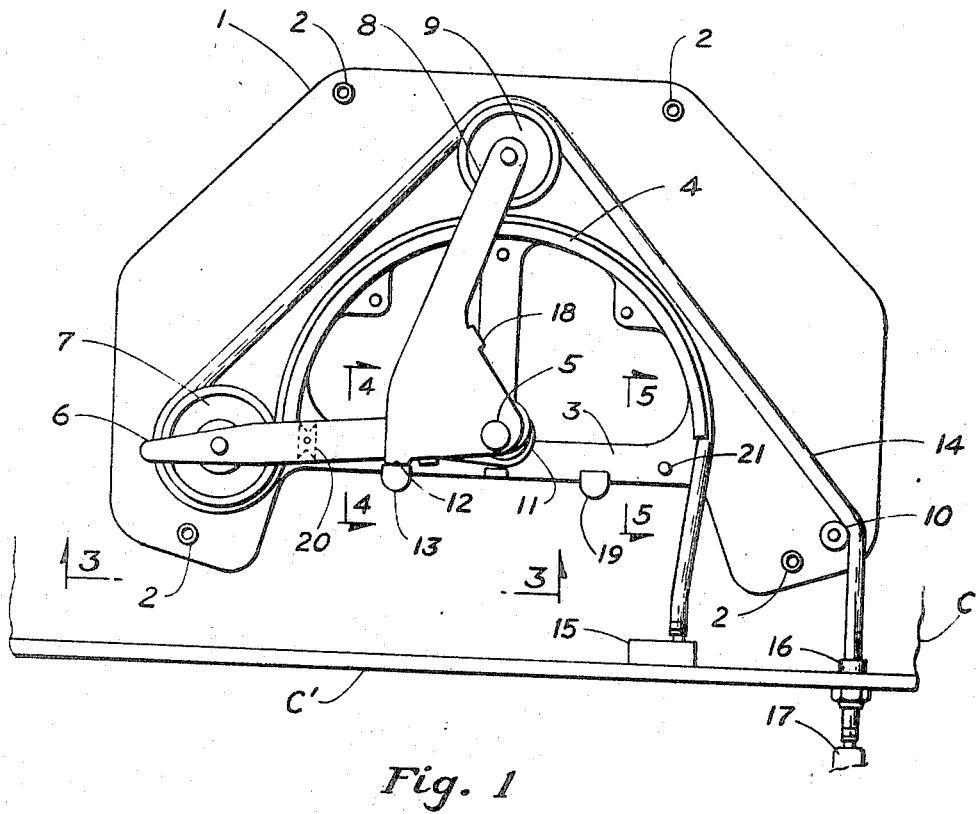
FIG. 1 is a plan view of the improved hose retraction unit, showing the hose fully retracted.
Figure 3:
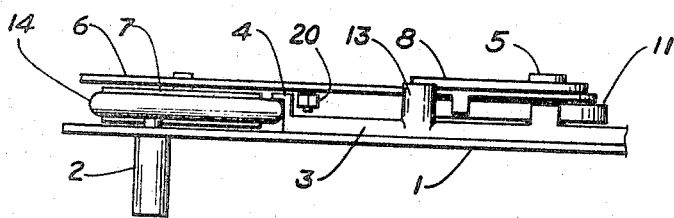
FIG. 3 is a fragmentary edge view of the unit; the view being taken substantially on line 3—3 of FIG. 1.

Referring now more particularly to the drawings and to the characters of reference marked thereon, the retraction unit comprises a flat, rigid base plate 1 having short depending tubular legs or feet 2 at spaced intervals about its periphery whereby said base plate is secured to and supported from the floor or bottom C of the enclosure (such as a cabinet or housing) in which the unit is disposed.

Secured on the base plate 1 is a frame 3 which includes a semicircular, outwardly facing, grooved hose guide 4 which is centered about a pin 5 mounted in and upstanding from the frame 3. Turnable on the pin 5, and projecting beyond the hose guide 4 in clearance relation thereto, is a swing arm 6; such arm normally being held adjacent one end of said guide 4 as will later appear.

The swing arm 6, outwardly of and in line with the guide 4, carries a peripherally grooved roller 7 disposed relatively close to said guide.

Also turnable on the pin 5 above and independently of the swing arm 6 is another swing arm 8; the latter, at its outer end, likewise carrying a peripherally grooved roller 9 aligned with and disposed fairly close to the guide 4.

Figure 2:
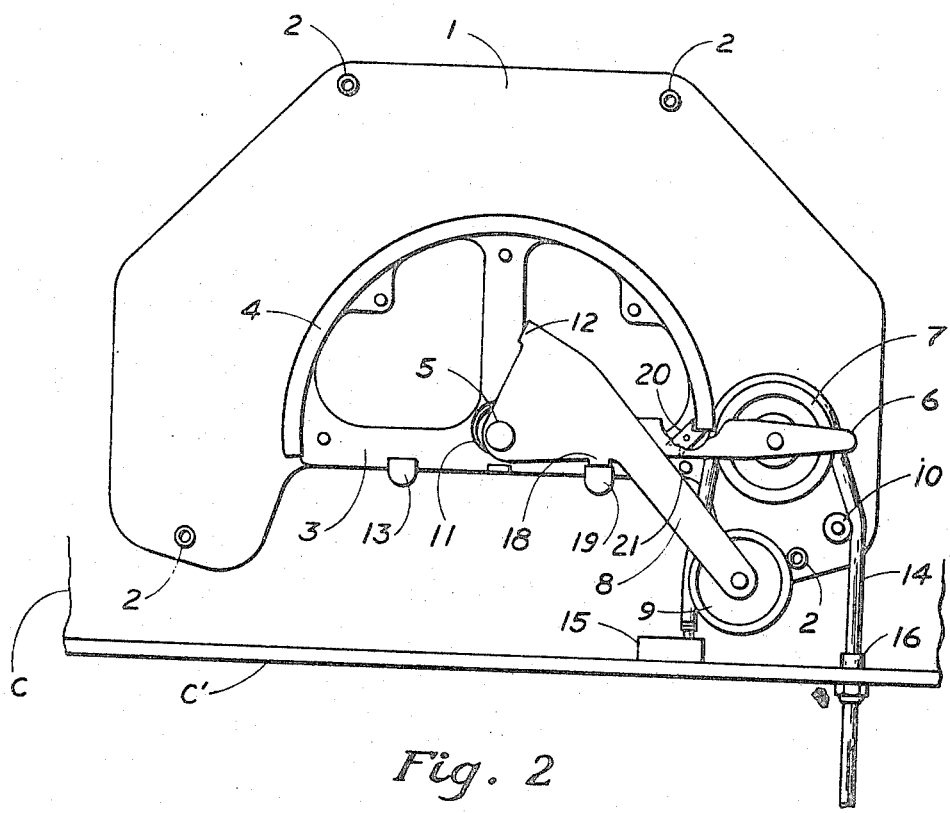
FIG. 2 is a similar view, but showing the hose as withdrawn and fully extended.
Figure 4:
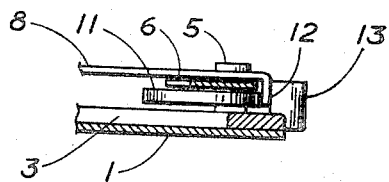
FIG. 4 is a fragmentary section taken substantially on line 4—4 of FIG. 1.
Figure 5:
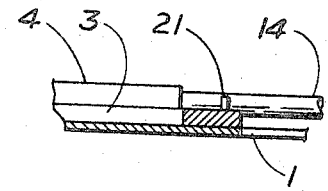
FIG. 5 is a fragmentary section taken substantially on line 5—5 of FIG. 1.

As mounted on the pin 5, the swing arms 6 and 8 are free to rotate from their initial or starting positions as shown in FIG. 1, to their advanced positions as shown in FIG. 2.

In such starting positions, the arm 6 extends to and beyond one end of the guide 4 so that the roller 7 is then disposed at said one end of said guide, while the arm 8 extends to and intersects such guide substantially centrally of its length so the roller 9 then lies approximately halfway between the ends thereof.

In the advanced positions of the arms 6 and 8, as shown in FIG. 2, the roller 7 occupies a position at the end of the guide 4 to which the arm 6 then extends, while the arms 8 positions the roller 9 slightly ahead of roller 7. The arms 6 and 8 are moved to their advanced positions, as in FIG. 2, in the manner hereinafter described.

A small, hose-guide roller 10 is mounted on the plate 1 at a point ahead of roler 7 and outwardly of roller 9 when said rollers are in advanced position.

A clock-type spring 11 is disposed about the pin 5 under the arm 6; one end of such spring being anchored relative to the guide 4 while the other end is attached to the arm 6 intermediate its ends. This spring is arranged to exert a yieldable force on the arm 6, urging the same in a direction toward its initial or starting position. Spring movement of the arm 6 in such direction and beyond the above position is prevented by the engagement of the arm 6 with a depending lug 12 on arm 8, and which lug 12 then engages an upstanding stop 13 on the frame 3, as shown in FIG. 1.

The flexible, small diameter, dental hose 14 is attached at one end to a fitting 15 mounted in the cabinet in generally tangential relation to the end of the guide 4 opposite the starting position of roller 7; such fitting being connected to a valve-controlled source of fluid (air, water, or a solution) under pressure.

The hose 14 is trained from fitting 15 to and about the guide 4 and thence about the roller 7. From roller 7 the hose passes back and over the roller 9, and then extends to and over the roller 10. From roller 10, the hose leads to and slidably extends through a short guide sleeve 16 in the front wall C¹ of the cabinet; the hose, beyond the sleeve 16, terminating in a suitable coupling 17 adapted for attachment to a dental instrument.

The length of the hose 14 is such that when the coupling 17 abuts the outer end of the sleeve 16, the hose is fully retracted into the cabinet and at which time the arms 6 and 8 are in their initial or starting position as shown in FIG. 1, and the hose is in a compact loop.

When the hose is pulled at its outer end and withdrawn from the cabinet, the motion is first transmitted to the arm 6 and roller 7, causing said arm to swing forward about the pivot 5 against the resistance of the spring 11. Then, when the arm 6 reaches a point adjacent the initial position of the roller 9, the forward edge of such arm engages a depending lug 18 on the arm 8 so that thereafter the arms 6 and 8 swing forward as a unit. When the arm 8 and its roller 9 reach fully advanced position, as in FIG. 2, the depending lug 18 engages an upstanding stop 19 on frame 3. At the same time, the arm 6 and roller 7, which have followed close behind arm 8, also reach fully advanced position, whereupon a conventional form of latch 20, on the underside of arm 6, automatically engages against the rear end of guide 4, as shown in FIG. 2.

It will be noted that the latch 20, which is of V-end form, is pivoted intermediate its ends on the arm 6 and rides close against the inner face of guide 4; such latch being deflected into the path of guide 4 by a pin 21, upstanding from the frame 3, when the arm 6 is pulled slightly ahead of its advanced position upon withdrawal of the hose from the cabinet. Then, when the pulling pressure on the hose is relieved and the arm 6 tends to retract, the latch 20 engages the guide 4 in holding relation. When the latch is thus engaged, the spring 11 cannot, of course, function to retract the hose, and the latter remains withdrawn outside the cabinet for free use of the instrument attached thereto.

The latch 20 is arranged so that with a direct or noslack pull on the withdrawn hose, the latch is released, thus allowing the spring 11 to function and return-rotate the arm 6, and with it the arm 8, to their initial or starting positions. This results in smooth re-entry of the hose into the cabinet and disposes such hose in the compact, loop form which it occupies when not in use.

It should be noted that the herein described hose retraction unit is arranged so that several thereof may be stacked for mounting in a single cabinet, and thereafter used separately without any interference with each other; the feet 2 of the separate units serving as the separating and locating means.

It should also be observed that while the hose retraction unit has been herein described as being horizontally disposed, it may be used with equal efficiency in a vertical position of desired.

From the foregoing description, it will be readily seen that there has been produced such a retraction unit, for a dental hose, as substantially fulfills the objects of the invention, as set forth herein.

I claim:

1. A retraction unit, for a flexible dental hose, comprising a fixed semicircular guide having one end adjacent a fluid supply fitting, a pair of swing arms pivoted in common axially of the guide, one arm initially extending to and beyond the other end of the guide, the other arm initially extending to and beyond the guide intermediate its ends, a first roller on the outer end of said one arm, a second roller on the outer end of said other arm, said rollers being disposed for movement in a path concentric with the periphery of the guide, the hose in initially looped form leading from the fitting to and about the guide from said one end to said other end thereof, thence passing about said first roller and extending to and passing over said second roller, and then returning to adjacent said one end of the guide; separate guide means cooperating with such returning portion of the hose and disposing its free end for manually grasping and pulling to shorten the loop and extend the hose, the arms in response to such shortening of the loop being swung to advanced positions with the rollers adjacent said one end of the guide, means including a spring to return the arms to their initial positions, and releasable latch means operative to hold the arms in such advanced positions.

2. A retraction unit, as in claim 1, in which said separate guide means includes a third hose-engaging roller mounted laterally outward from said one end of the semicircular guide and disposed to maintain said returning portion of the hose in clearance relation to all other portions of the hose.

3. A retraction unit, as in claim 1, including a cooperating engagement element between the arms arranged so that when said one arm swings to adjacent said other arm, both arms are then moved in unitary relation to their advanced positions.

4. A retraction unit, as in claim 1, in which the arm-return means includes a cooperating engagement element between the arms arranged so that when said one arm spring-returns to its initial position, the other arm is caused to return to its corresponding position.

5. A retraction unit, as in claim 4, including a fixed stop positioned to prevent spring-return movement of said one arm beyond its initial position.

6. A retraction unit, for a flexible dental hose, comprising a substantially semicircular guide mounted in a fixed position, a fluid supply fitting fixed with respect to and in the plane of the guide beyond one end of the same, the hose being connected to the fitting and thence initially passing about and being engaged with the guide to the other end thereof, a roller disposed in the plane of the guide and initially positioned adjacent said other end thereof, the hose passing about the roller from said other end of the guide, means mounting the roller for movement in a path concentric with the periphery of the guide and to an advanced position adjacent said one end thereof, spring means yieldably urging the roller toward said other end of the guide, another roller disposed in the plane of the guide and initially positioned intermediate the ends thereof, means mounting said other roller for movement in a path concentric to the guide and to an advanced position adjacent said one end thereof, the hose engaging over said other roller after leaving the first named roller, means to cause said other roller to begin such movement and to then travel slightly ahead of said first named roller upon the latter approaching said other roller, separate guide means for the returning portion of the hose adjacent said one end of the guide and clear of the rollers in said advanced positions thereof, a free end portion of the hose extending beyond said separate guide means for manual grasping and whereby upon a pull being imparted to said free end portion the rollers are moved from their initial positions to said advanced positions and the hose is extended, means to releasably latch the rollers in said advanced positions thereof, and means to return said other roller to its initial position upon release of the latch means and in response to movement by the spring means of said first named roller to its initial position.

7. A hose retraction unit, as in claim 6, in which said first named means comprises, with a pin mounted axially of the guide, a swing arm turnable on the pin, and on the outer end of which arm the first named roller is journaled.

8. A hose retraction unit, as in claim 7, in which said spring means is connected with and acts on said swing arm.

9. A hose retraction unit, as in claim 6, in which said separate guide means includes a fixed sleeve through and beyond which said free end portion of the hose projects, and a third hose-engaging roller mounted in a fixed position between the sleeve and semicircular guide and disposed to maintain said returning portion of the hose in clearance relation to all other portions of the hose.

(References on following page)

References Cited

UNITED STATES PATENTS

| | | | | |
|---|---|---|---|---|
| 1,649,251 | 11/1927 | Pieper | | 32—22 |
| 1,940,701 | 12/1933 | Shope | | 137—355.23 XR |
| 2,002,777 | 5/1935 | Johnson | | 137—355.23 |
| 2,214,774 | 9/1940 | Pieper | | 32—22 |
| 2,690,945 | 10/1954 | Bronk | | 32—22 XR |
| 3,259,430 | 7/1966 | Beach | | 32—22 XR |
| 3,271,859 | 9/1966 | Horowitz et al. | | 32—22 |
| 3,391,875 | 7/1968 | Hamrick | | 137—355.23 XR |
| 3,427,719 | 2/1969 | Gordon et al. | | 32—22 |

SAMUEL SCOTT, Primary Examiner

U.S. Cl. X.R.

32—22